UNITED STATES PATENT OFFICE.

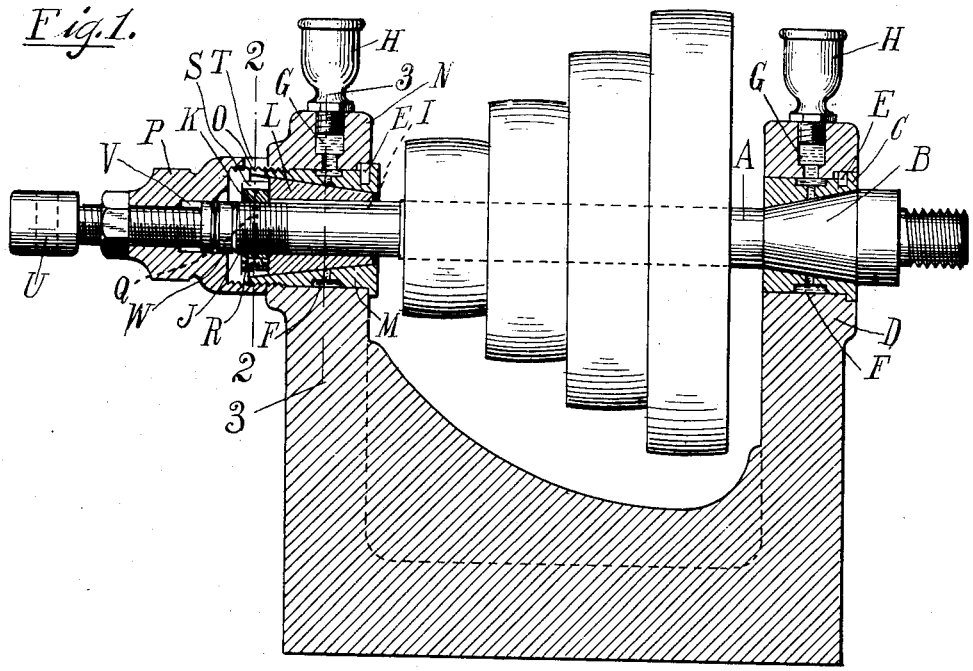
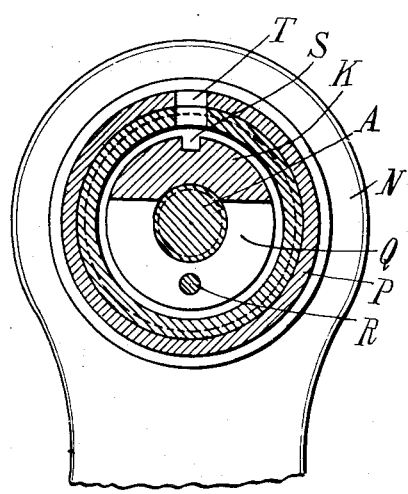
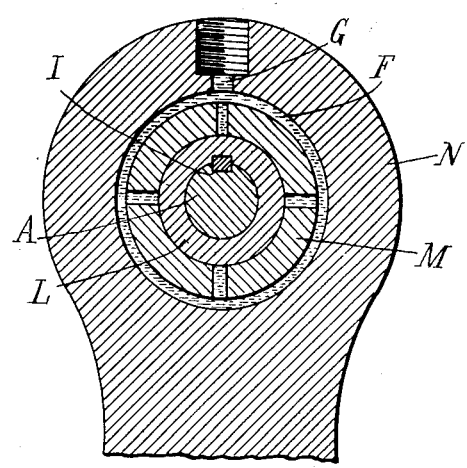

FRITZ SCHULZ, OF CHICAGO, ILLINOIS, ASSIGNOR TO THE GOOD MANUFACTURING CO., OF CHICAGO, ILLINOIS, A CORPORATION OF ILLINOIS.

SPINDLE-BEARING.

No. 814,168.

Specification of Letters Patent.

Patented March 6, 1906.

Application filed May 1, 1905. Serial No. 258,365.

*To all whom it may concern:*

Be it known that I, FRITZ SCHULZ, a citizen of the United States, residing at Chicago, in the county of Cook and State of Illinois, have invented certain new and useful Improvements in Spindle-Bearings; and I do hereby declare the following to be a full, clear, and exact description of the invention, such as will enable others skilled in the art to which it appertains to make and use the same.

My invention relates to a novel construction in a spindle adapted for use on high-speed machinery—such, for instance, as metal-spinners' lathes, buffers, grinders, &c.—the object being to provide a device of this character in which the bearings can be readily maintained perfectly true and can be adjusted any time without disassembling the parts; and it consists in the features of construction and combinations of parts hereinafter fully described and claimed.

In the accompanying drawings, illustrating my invention, Figure 1 is a central vertical section of a high-speed spindle constructed in accordance with my invention. Figs. 2 and 3 are detail vertical transverse sections, on an enlarged scale, on the lines 2 2 and 3 3, respectively, of Fig. 1.

The spindles or shafts and bearings of high-speed machinery very readily become loose and untrue, and consequently rattle in the bearings, thus making lubrication both difficult and expensive. The said spindles are not readily adjustable, and to repair the same it is generally necessary to rebabbit the bearings.

The main object of my invention is to provide means for readily adjusting the bearings to maintain the same true without necessitating any loss of time otherwise incurred by taking apart the machine containing such spindle and to provide ample means for thoroughly lubricating the running parts.

To these and other ends my invention comprises a shaft A, provided adjacent one end with an annular conical enlargement B, which is adapted to run in a tapered bushing C, mounted in the standard D of the machine, said bushing being held against rotation by means of a pin E on said bushing entering a recess in the opening of said standard D adapted to receive the same. The said bushing C is provided with an annular groove or recess F, communicating with a plurality of radial openings in said bushing and with an opening G in said standard, into which lubricating-oil is fed from a cup H or in any other suitable manner. At its other end said shaft A is provided with a longitudinal key-seat I, in which a key is mounted, and the extreme end of said shaft is threaded, as at J, to receive a collar K. A cone L, having a groove to receive the projecting portion of the key, is longitudinally movable on said end of said shaft A, being held by said key against rotation relatively thereto, said cone being oppositely disposed relatively to the cone B and fitting within a bushing M in the standard N, said bushing corresponding in construction with said bushing C, but being longer and externally threaded, as at O, at its extreme end, which projects beyond the outer face of said standard N and receives the internally-threaded cap P, which holds said bushing securely in place within said standard. The said collar K is cylindrical and laterally split or bifurcated by means of a slot Q. extending through more than one-half the diameter and circumference of said collar. In the free end of one of the tongues of said collar is a threaded opening adapted to receive the set-screw R, passing freely through an opening in the other tongue and by means of which said tongues are contracted toward each other to securely bind said collar on the said threaded end of said shaft A. In the opposite portion of said collar is a peripheral recess S, and in said cap P and projecting end of said bushing M are readjusting-openings T, through which a pin may be inserted to enter and engage said recess S to hold said collar against revolution relatively to said bushing.

The operation of my device is as follows: When it is desired to adjust the bearings, the spindle is stopped and a pin inserted in the opening T and pressed upon the collar. The spindle is then revolved by hand until said pin springs into said recess S, and by then revolving the spindle in the other direction slowly the bearings may be adjusted to run either more freely or more snugly in an obvious manner, and when the proper adjustment has been attained the pin is removed. If said spindle or shaft A is to bear end pressure, a set-screw U may be mounted in the cap P to enter a central recess V in the latter, in which one or more disks W are mounted, against which the end of said shaft A is adapted to bear, said disks being held in desired position to relieve the bearings of pressure by means of said set-screw U.

My said device is very simple, efficient, and durable and very quick and easily adjusted.

I claim as my invention—

1. In a device of the kind specified, the combination with standards, of bushings mounted therein having oppositely-disposed tapered longitudinal openings and substantially radial openings to admit a lubricant, a shaft provided at one end with a rigid annular conical enlargement adapted to fit the tapered opening of one of said bushings, a cone on the other end of said shaft longitudinally movable thereon but incapable of relative rotation, said other end of said shaft being threaded, a laterally-split collar on said threaded end bearing against said cone and having a set-screw spanning the split portion of same to bind said collar on said threaded end of said shaft, said collar having a peripheral recess adapted to receive means for holding same against rotation relatively to the frame of the machine whereby by turning said shaft relatively thereto the bearings may be adjusted to run more snugly or freely.

2. In a device of the kind specified, the combination with standards having openings, bushings having oppositely-disposed tapered openings mounted in said standards and having annular grooves communicating with said tapered openings to feed a lubricant, one of said bushings being externally threaded at one end and projecting at said end beyond one of the said standards, of a shaft having oppositely-disposed cones mounted thereon, one of said cones being rigid and the other thereof longitudinally movable on said shaft but incapable of rotation relatively thereto, said last-named cone being adapted to fit said threaded bushing and said end of said shaft carrying same being threaded, an elastic collar mounted on said threaded end of said spindle and adapted to be adjusted to bind thereon and a cap engaging the threaded end of said bushing, said collar being provided with a peripheral recess and said bushing and cap having a radial opening through which a pin may be inserted to engage said recess to hold said collar rigid with said standards.

In testimony whereof I have signed my name in presence of two subscribing witnesses.

FRITZ SCHULZ.

Witnesses:
RUDOLPH WM. LOTZ.
E. M. SCHERBARTH.